United States Patent
DeStefano et al.

[11] Patent Number: 5,816,197
[45] Date of Patent: Oct. 6, 1998

[54] INJECTION SHIELD

[76] Inventors: Michelle S. DeStefano, 201 Herman Dr., North Syracuse, N.Y. 13212; Michael H. Cynamon, 7 Pebble Hill Road North, DeWitt, N.Y. 13214; Daniel F. Sammons, 7718 Bainbridge Dr., Liverpool, N.Y. 13090

[21] Appl. No.: 946,259

[22] Filed: Oct. 7, 1997

[51] Int. Cl.⁶ .......................... A61B 19/00; A01K 13/00
[52] U.S. Cl. .......................... 119/712; 119/417; 128/919
[58] Field of Search .................. 128/846, 877, 128/878, 879, 919; 604/192, 198, 263; 119/417, 427, 712, 751, 752, 755, 756, 753

[56] References Cited

U.S. PATENT DOCUMENTS

| | | | |
|---|---|---|---|
| 3,094,101 | 6/1963 | Porter | 119/752 |
| 3,103,204 | 9/1963 | Greene | 119/751 |
| 3,442,255 | 5/1969 | Berkowitz | 119/753 |
| 3,739,751 | 6/1973 | Mohr et al. | 119/752 |
| 3,973,522 | 8/1976 | Rosow | 119/756 |
| 4,709,660 | 12/1987 | Hrushosky | 119/751 |
| 5,320,069 | 6/1994 | Anderson, Jr. et al. | 119/751 |
| 5,342,311 | 8/1994 | Dirina | 604/116 |
| 5,343,875 | 9/1994 | Chase | 128/846 |
| 5,401,252 | 3/1995 | Deal | 604/192 |
| 5,531,704 | 7/1996 | Knotek | 128/919 X |

*Primary Examiner*—Robert P. Swiatek
*Assistant Examiner*—James S. Bergin
*Attorney, Agent, or Firm*—Trapani & Molldrem

[57] ABSTRACT

An injection shield for protecting a person's hand during the injection of a needle into a rodent's tail. The shield comprises a frame which includes a coupler for a rodent restrainer, and contains an opening for a rodent's tail. The frame includes an injection surface on an injection side of the frame. The coupler is adapted to receive and releasably secure the restrainer in an orientation that permits the tail to be placed on the injection surface of the frame. The opening is dimensioned to allow the tail to pass through the frame, from the injection side to a shielded side. The opening is a sufficient distance from the coupler to allow the tail to extend through the opening and be grasped by the person's hand or otherwise secured. A method of protecting a person's hand during the injection of a needle into a rodent's tail is also contemplated by the present invention.

10 Claims, 4 Drawing Sheets

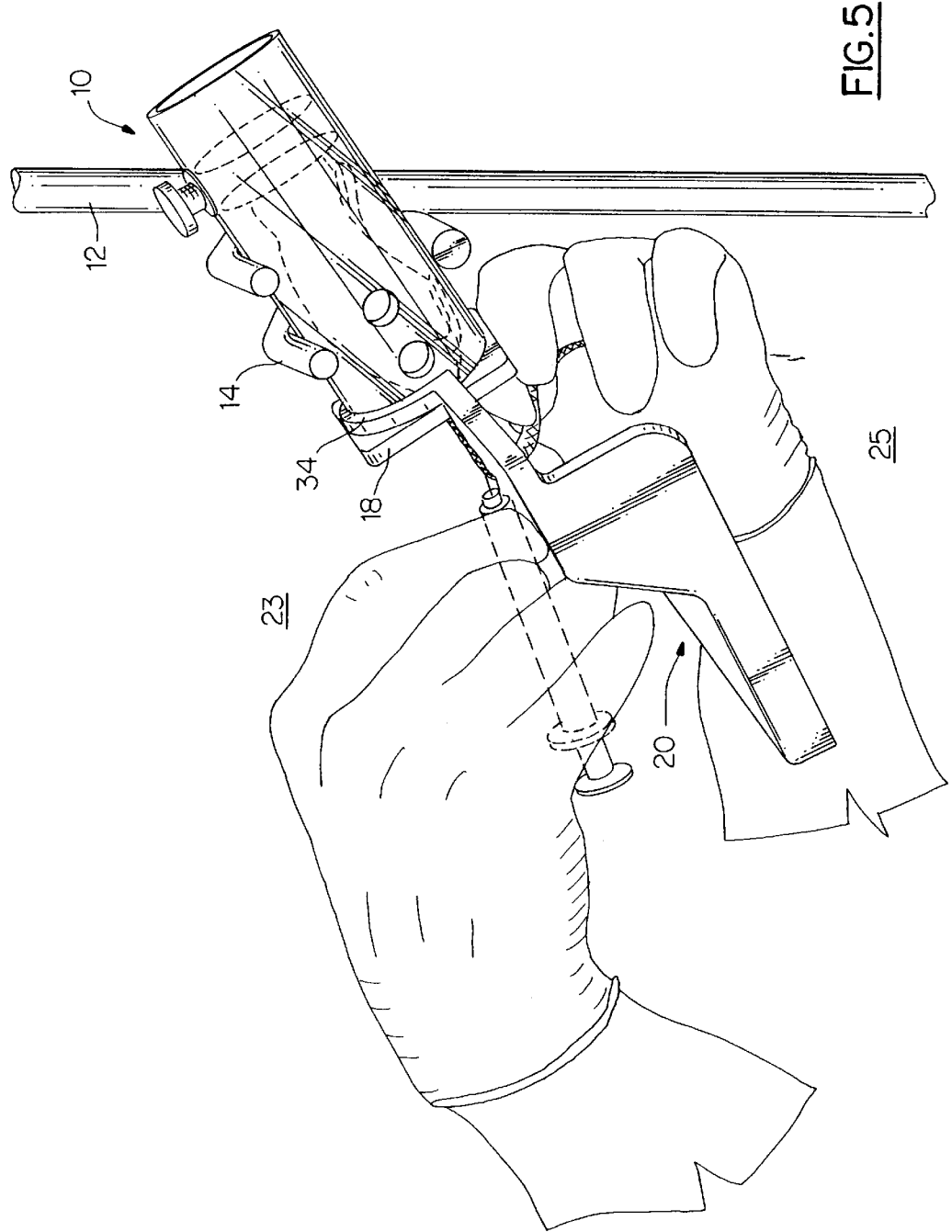

INJECTION SHIELD

BACKGROUND OF THE INVENTION

1. Technical Field

The present invention relates generally to apparatus used in medical research laboratories, and more particularly to safety apparatus which protect against needle stick during the injection of a needle into a laboratory rodent.

2. Background Art

It is routine for research laboratories to utilize rodents during the course of medical research and experimentation. Rodents are used because many of their physiological characteristics are similar to humans. In the course of such research and experimentation, fluids are frequently injected into and extracted from the rodent's tail. To perform such a procedure, the rodent must first be restrained and its tail isolated for injection. A number of devices have been made available for restraining the rodent and isolating its tail.

One such device, referred to as a "rodent", "acrylic" or "broome" restrainer, has become very popular. This type of restrainer does an excellent job restraining the rodent and isolating its tail. However, it does not provide means for securing or stabilizing the tail for injection. Thus, laboratory personnel performing the injection procedure routinely secure the tail with their fingers, as illustrated in FIG. 1 herein. This practice automatically locates the fingers on the part of the tail which is exposed for injection with the needle. The fingers are thus susceptible to being pricked, punctured or stuck with the needle (i.e., "needle stick"). This hazard can be extremely dangerous in light of the many infectious and deadly diseases being researched in the laboratory today.

Other, less popular, types of restraining devices have provided means for securing the tail. For example, U.S. Pat. No. 4,709,660 to Hrushesky, U.S. Pat. No. 3,442,255 to Berkowitz, U.S. Pat. No. 3,103,204 to Greene, and U.S. Pat. No. 3,094,101 to Porter, all disclose means for securing the tail. While the various tail securing means disclosed in these patents will relieve the fingers from a tail securing role, they suffer from obvious drawbacks. None of these patented devices prevent, or at least discourage, the possibility of a free hand wandering in harms way of the needle during injection. Without such prevention or determent, a free hand may be used to guide or stabilize the needle during injection, thus exposing the hand to the same needle stick hazard experienced with the more popular rodent restrainers.

Another drawback is that these patented devices use various mechanical clamping means, some of which are simply separate clamps. Clamping means may restrict blood flow in the tail of the rodent, and impede injection. Separate clamps are likely to be misplaced in a busy laboratory, and thus may not be available when a rodent tail needs to be injected. Similarly, the other mechanical clamping means disclosed in the above-cited patents are likely to malfunction over time. These patents ignore the reality that the hand usually becomes the most convenient substitute for a misplaced or malfunctioning clamp. Thus, these patented devices do not offer an acceptable solution to the problem of needle stick during the injection of a rodent tail.

A further drawback of the above-mentioned patented devices is that they are all elaborate, cumbersome and expensive. They employ a number of moving parts which makes them inherently less reliable than a device with no moving parts. In addition, they are difficult to maintain and clean.

From the foregoing discussion, it is apparent that there still remains a long felt, but unfulfilled need to provide an acceptable device for preventing incidents of needle stick during the injection of a rodent tail.

OBJECTS AND SUMMARY OF THE INVENTION

It is therefore an object of the present invention to provide an apparatus that avoids the aforementioned problems associated with the prior art.

It is another object of the present invention to provide an apparatus that prevents incidents of needle stick during the injection of a rodent tail.

It is a further object of the present invention to provide an apparatus that shields the hand which secures the rodent tail for injection.

It is still another object of the present invention to provide an apparatus which prevents, or at least discourages, the possibility of a free hand wandering in harms way of the needle during injection.

It is still a further object of the present invention to provide an apparatus which encourages one hand to be located in a shielded position while the other hand is used to inject a needle into the rodent tail.

It is yet another object of the present invention to provide an injection shield that stabilizes the rodent tail and provides a secure injection surface.

It is yet a further object of the present invention to provide an injection shield that is simple in design, with no moving parts.

It is still yet another object of the present invention to provide an injection shield that is lightweight and easy to handle.

It is still yet a further object of the present invention to provide an injection shield that is easy to maintain and clean.

It is still yet a further object of the present invention to provide an injection shield that is relatively inexpensive to manufacture.

These and other objects are attained in accordance with the present invention wherein there is provided an injection shield for protecting a person's hand during the injection of a needle into a rodent's tail. The shield comprises a frame which includes a coupler for a rodent restrainer, and contains an opening for a rodent tail. The frame includes an injection surface on an injection side of the frame.

The coupler is adapted to receive and releasably secure the rodent restrainer in an orientation that permits the rodent's tail to be placed on the injection surface of the frame. The opening is dimensioned to allow the tip of the rodent tail to pass through the frame, from the injection side to a shielded side. The opening is positioned a sufficient distance from the coupler to allow the tail to extend through the opening and be grasped by the person's hand, or otherwise secured, at a point on the shielded side of the frame.

In operation, the frame serves to shield the point where the tail is grasped (or otherwise secured) while the rodent tail is being injected with a needle.

The method of protecting a person's hand during the injection of a needle into a rodent's tail, is also contemplated by the present invention. The method employs a rodent restrainer for containing the rodent and isolating its tail for injection. The restrainer is of the type which contains an opening through which the rodent tail protrudes.

The method comprises the steps of: (a) coupling the rodent restrainer to a frame which includes an injection surface on an injection side of the frame; (b) passing the tip of the rodent tail from the injection side of the frame, through a hole contained in the frame, to a shielded side of the frame; (c) grasping or otherwise securing the tip of the tail on the shielded side of the frame; and (d) injecting a needle into the tail of the rodent on the injection side of the frame.

BRIEF DESCRIPTION OF THE DRAWING

Further objects of the present invention will become apparent from the following description of the preferred embodiment with reference to the accompanying drawing, in which:

FIG. 5 is an elevation view of a rodent restrainer mounted on an upright stand and coupled to the injection shield of the present invention, and illustrating the injection of a mouse tail in accordance with a procedure of the present invention.

DETAILED DESCRIPTION OF THE PREFERRED EMBODIMENT

Figure 1:
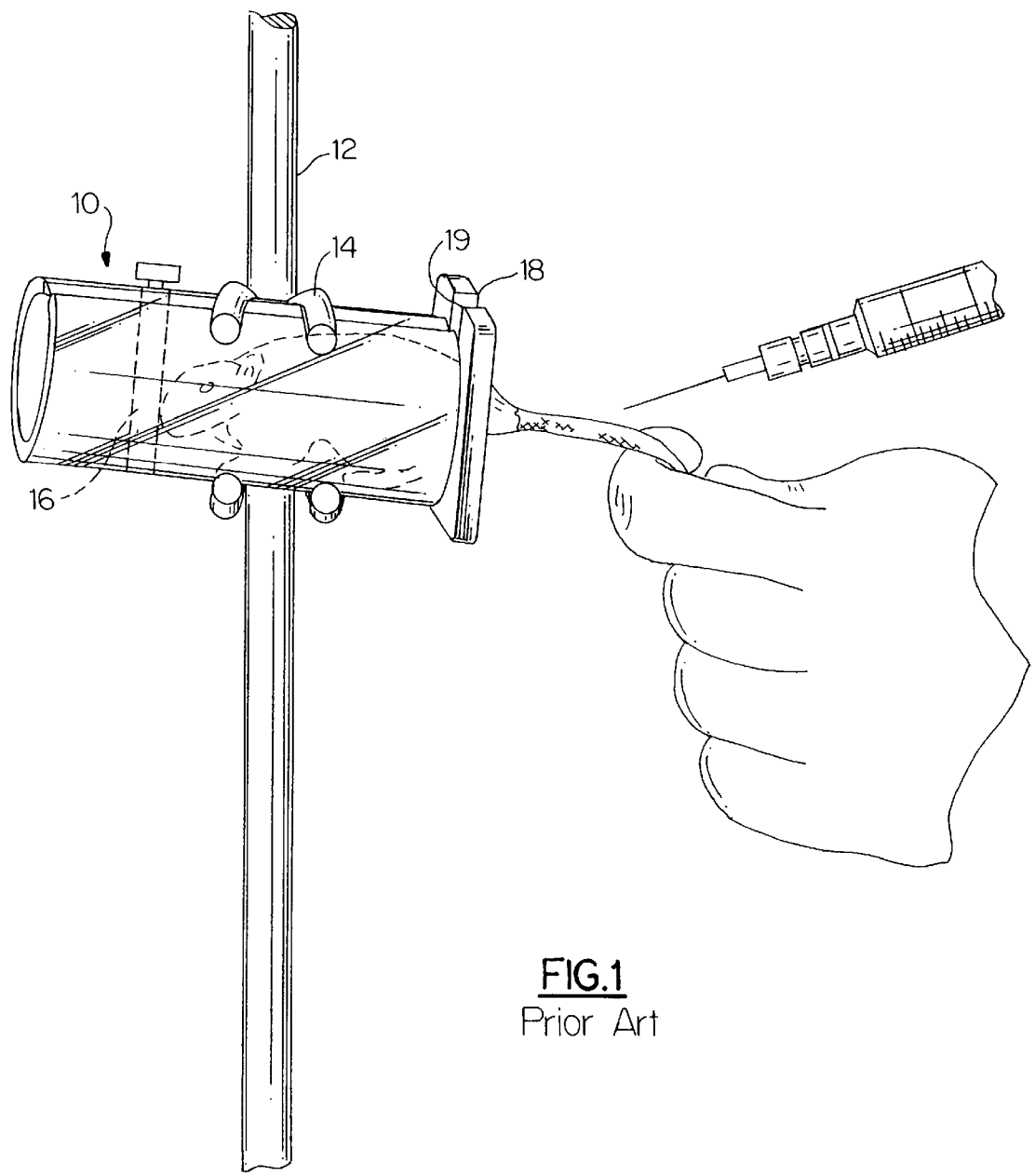
FIG. 1 is an elevation view of a rodent restrainer mounted on an upright stand, and containing a mouse, the tail of which is about to be injected in accordance with a conventional procedure.

With reference to FIG. 1, there is shown a rodent restrainer 10 mounted on an upright stand 12 with a clamp 14. Restrainer 10 contains a mouse which is urged up against the rear of the restrainer by an adjustable nose piece 16. A rear wall 18 contains a slotted hole 19 through which the mouse's tail protrudes. Rodent restrainer 10 is of the type which is popularly known as a "Broome" Restrainer, Universal Rat Restrainer, or Acrylic Restrainer. FIG. 1 illustrates a conventional procedure, used with this type of restrainer, for injecting the tail of a mouse with a needle. FIG. 1 clearly shows how a person's fingers are directly exposed to the needle during this procedure. This hazard to needle stick is precisely what the present invention is intended to prevent.

Figure 2:
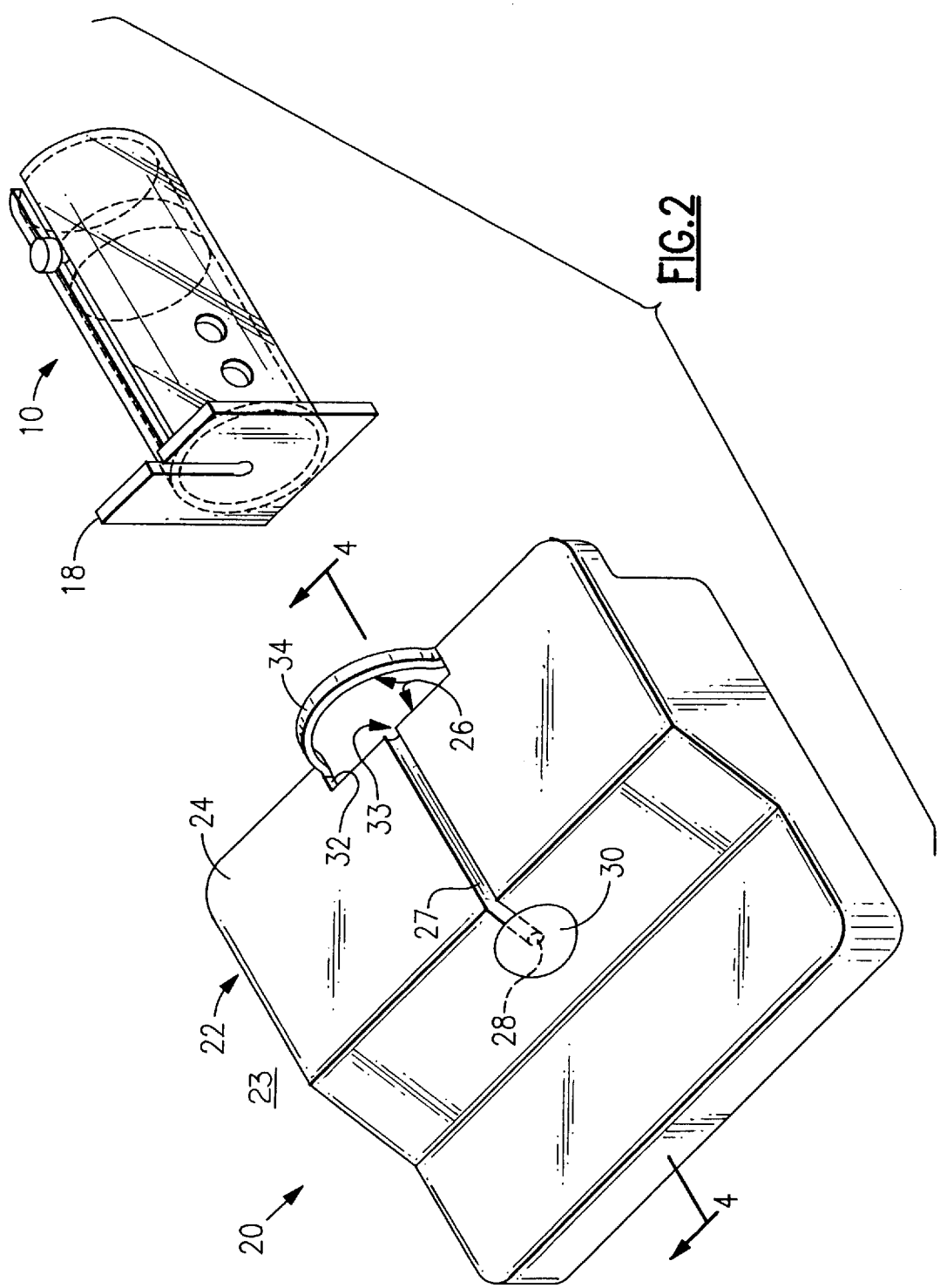
FIG. 2 is a perspective view of an injection shield of the present invention, shown with a rodent restrainer.
Figure 3:
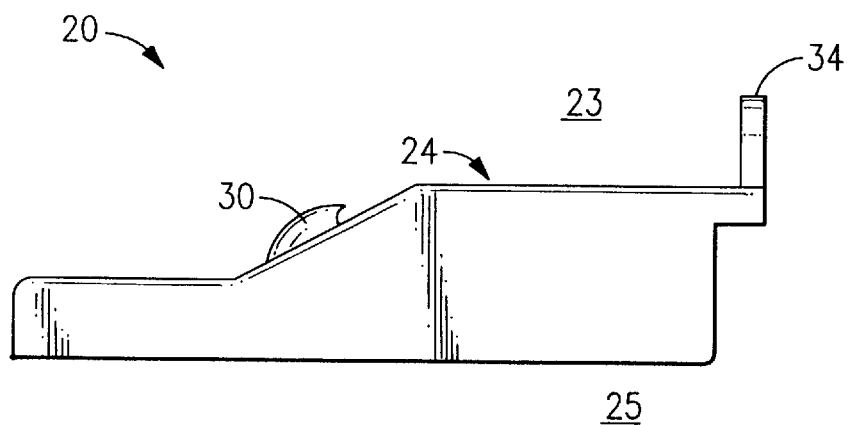
FIG. 3 is a side elevation view of the injection shield of FIG. 2.
Figure 4:
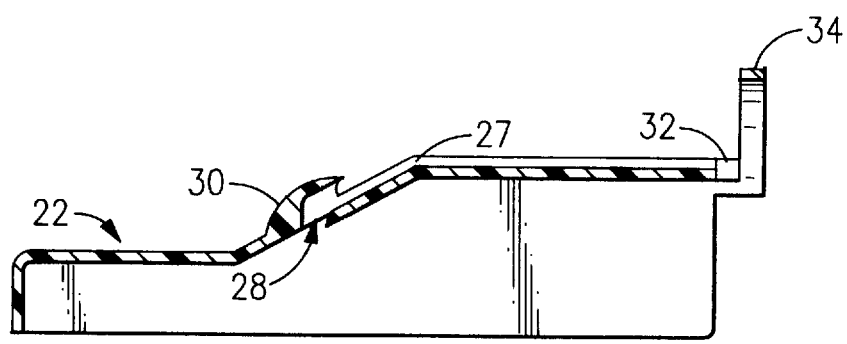
FIG. 4 is a cross-sectional view of the injection shield, taken along line 4—4 in FIG. 2.

With reference now to FIGS. 2–4, there is shown an injection shield 20, constructed in accordance with the present invention. Shield 20 includes a frame 22 having an injection surface 24 and a coupler 26. Injection surface 24 contains a tail groove 27 running from coupler 26 to an opening 28 in frame 22. A needle guard 30 is positioned adjacent to opening 28. An injection side 23 and a shielded side 25 (See FIG. 5) are defined herein as convenient reference points used in the following disclosure and claims. Injection surface 24 faces injection side 23. As shown in FIG. 5, frame 22 is sufficiently dimensioned to shield a person's hand and lower forearm, both of which are located on shielded side 25.

As shown in FIG. 2, coupler 26 comprises a recess 32 and a retaining bridge 34, which together form a slot 33. Coupler 26 is configured and dimensioned to allow wall 18 of restrainer 10 to be inserted through slot 33, from underneath frame 22, and engage recess 32 and bridge 34. Restrainer 10 is secured in coupler 26 by a tight frictional engagement of wall 18 between recess 32 and bridge 34, and by a moment force which urges the top portion of wall 18 against bridge 34 and the bottom portion of wall 18 against recess 32. The moment force is created when restrainer 10 is cantilevered in coupler 26. As understood from FIGS. 2 and 5, coupler 26 is configured to secure restrainer 10 in an orientation that permits a rodent's tail to be placed on injection surface 24 and in groove 27.

Opening 28 passes through frame 22, as best shown in FIG. 4. Opening 28 is dimensioned to allow a rodent's tail to pass through frame 22, from injection side 23 to shielded side 25 (See FIG. 5). Opening 28 is positioned from coupler 26 a distance which is less than the typical length of a rodent tail, such that the rodent tail is allowed to extend through opening 28 a sufficient length to be grasped or otherwise secured on the shielded side of frame 22 (See FIG. 5).

Groove 27 is configured and dimensioned to receive and guide the rodent's tail, and contain it while the tail is being grasped or otherwise secured (See FIGS. 2 and 5). Groove 27 stabilizes the tail on injection surface 24 while the tail is being injected with a needle. As shown in FIGS. 2 and 4, needle guard 30 is configured to block opening 28 from an approaching needle during the injection of the rodent tail (See FIG. 5). Without guard 30, there is a possibility that the needle could pass through opening 28, sticking the hand. Needle guard 30 virtually eliminates this possibility.

The preferred method of protecting a person's hand during the injection of a needle into a rodent's tail is illustrated in FIG. 5. In accordance with the present invention, this method comprises the steps of: (a) coupling restrainer 10, containing a rodent to be injected, to coupler 26 in the orientation shown in FIG. 5; (b) positioning the rodent's tail on injection surface 24 and placing it in groove 27; (c) passing the tip of the rodent's tail through opening 28, from injection side 23 to shielded side 25; (d) grasping or otherwise securing the tip of the tail on shielded side 25; (e) containing the rodent's tail in groove 27; and (f) injecting a needle into the rodent's tail on injection side 23. As shown in FIG. 5, frame 22 serves to shield the point where the tail is being grasped or otherwise secured.

By requiring the rodent tail to be secured under frame 22 (i.e., on shielded side 25), the person performing the injection procedure automatically positions her or his free hand (i.e., the hand not holding the needle) under the frame and out of harms way of the needle.

Shield 20 is a simple one-piece article of manufacture which is easy to maintain and clean. This is particularly important because the shield 20 must be cleaned frequently and, in many applications, sterilized. The preferred material for shield 20 is a light-weight rigid plastic material, which is durable and resistant to chemical cleaning solutions and heat. One such plastic material is ULTEM® 1000 resin, manufactured by the General Electric Corporation. This material is remarkably resistant to bleach soakings and autoclave sterilization. At a minimum, the plastic material must be able to withstand repeated autoclavings up to 121° C. and chemical sterilizations. The simplicity of the one-piece design of shield 20 also translates to a low manufacturing cost.

While the preferred embodiments of the invention have been particularly described in the specification and illustrated in the drawing, it should be understood that the invention is not so limited. Many modifications, equivalents, and adaptations of the invention will become apparent to those skilled in the art without departing from the spirit and scope of the invention as defined in the appended claims.

What we claim is:

1. A shield for protecting a person's hand during the injection of a needle into a rodent which is being restrained in a restrainer, said shield comprising:

a frame, including an injection surface on an injection side of said frame, said frame further including a coupler configured and dimensioned to receive and releasably secure the restrainer in an orientation that permits the rodent's tail to be placed on the injection surface of said frame, said frame containing an opening which is dimensioned to allow the tip of the rodent tail to pass through said frame from the injection side to a shielded side, the opening being positioned from said coupler a distance that allows the tail to extend through the opening and be grasped by the person's hand or otherwise secured, at a point on the shielded side of said frame, whereby said frame serves to shield the point where the tail is grasped or otherwise secured, while the rodent tail is being injected on the injection side of said frame.

2. The shield as recited in claim 1, wherein the injection surface of said frame contains a groove which runs from said coupler to the opening in said frame, the groove being configured and dimensioned to receive the rodent tail and contain it therein while the tail is being grasped or otherwise secured.

3. The shield as recited in claim 1, wherein said frame is composed of a light-weight plastic material.

4. The shield as recited in claim 1, wherein said frame is dimensioned to shield at least the person's hand.

5. The shield as recited in claim 1, wherein a recess contained in said frame forms part of said coupler, said recess being adapted to receive the restrainer for coupling.

6. The shield as recited in claim 5, wherein said coupler further includes a retaining member bridging the recess in said frame, and being positioned, configured and dimensioned to allow the restrainer to be inserted and secured between the recess and the retaining member.

7. A shield for protecting a person's hand during the injection of a needle into a rodent which is being restrained in a restrainer, said shield comprising:

a frame, including an injection surface on an injection side of said frame, said frame further including a coupler configured and dimensioned to receive and releasably secure the restrainer in an orientation that permits the rodent's tail to be placed on the injection surface of said frame, said frame containing an opening which is dimensioned to allow the tip of the rodent tail to pass through said frame from the injection side to a shielded side, the opening being positioned from said coupler a distance that allows the tail to extend through the opening and be grasped by the person's hand on the shielded side of said frame, whereby said frame serves to shield the person's one hand on the shielded side of said frame, while the rodent tail is being injected by the person's other hand on the injection side of said frame.

8. A method of protecting a person's hand during the injection of a needle into a rodent which is restrained in a restrainer of the type containing an opening through which the rodent's tail protrudes, said method comprising the steps of:

(a) coupling the restrainer to a frame which includes an injection surface on an injection side of the frame;

(b) passing the tip of the rodent tail from the injection side of the frame, through a hole contained in the frame, to a shielded side of the frame;

(c) grasping or otherwise securing the tip of the tail on the shielded side of the frame; and (d) injecting a needle into the tail of the rodent on the injection side of the frame.

9. The method as recited in claim 8, further comprising positioning the tail of the rodent on the injection surface of the frame.

10. The method as recited in claim 9, wherein said step of positioning the tail includes placing the tail in a groove contained in the injection surface of the frame, and containing the tail therein while the tip of the tail is being grasped or otherwise secured on the shielded side of the frame.

* * * * *